United States Patent [19]

Hashimoto

[11] Patent Number: 4,608,458
[45] Date of Patent: Aug. 26, 1986

[54] AUTOMATIC TELEPHONE ANSWERING APPARATUS

[75] Inventor: Kazuo Hashimoto, Tokyo, Japan
[73] Assignee: Hashimoto Corporation, Tokyo, Japan
[21] Appl. No.: 576,213
[22] Filed: Feb. 1, 1984
[30] Foreign Application Priority Data Feb. 3, 1983 [JP] Japan ................................. 58-16710

[51] Int. Cl.⁴ ............................................ H04M 11/10
[52] U.S. Cl. ..................................... 179/2 A; 179/6.03
[58] Field of Search .................... 179/2 A, 2 E, 2 EA, 179/6.11, 6.03, 6.01

[56] References Cited

U.S. PATENT DOCUMENTS 3,133,992  5/1964  Dickman ..................... 179/2 EA X
4,500,752  2/1985  Lee ................................. 179/2 A X Primary Examiner—James L. Dwyer
Attorney, Agent, or Firm—Lowe Price LeBlanc Becker & Shur

[57] ABSTRACT

A telephone answering apparatus responds to an incoming call by reproducing a message greeting the caller and requesting the caller's name. The response by the caller is amplified in the region of a called parties telephone set to be heard by the called party. If the called party is able to receive the call immediately, an acknowledgment signal is transmitted via a wireless transceiver carried by him back to the answering machine so that a message such as "Please wait a moment." is reproduced. A third message advising the called party is not available but will return the call is generated automatically after a predetermined time duration if the acknowledgment signal is not transmitted by the called party via the transceiver or the called party has not answered the telephone.

3 Claims, 1 Drawing Figure

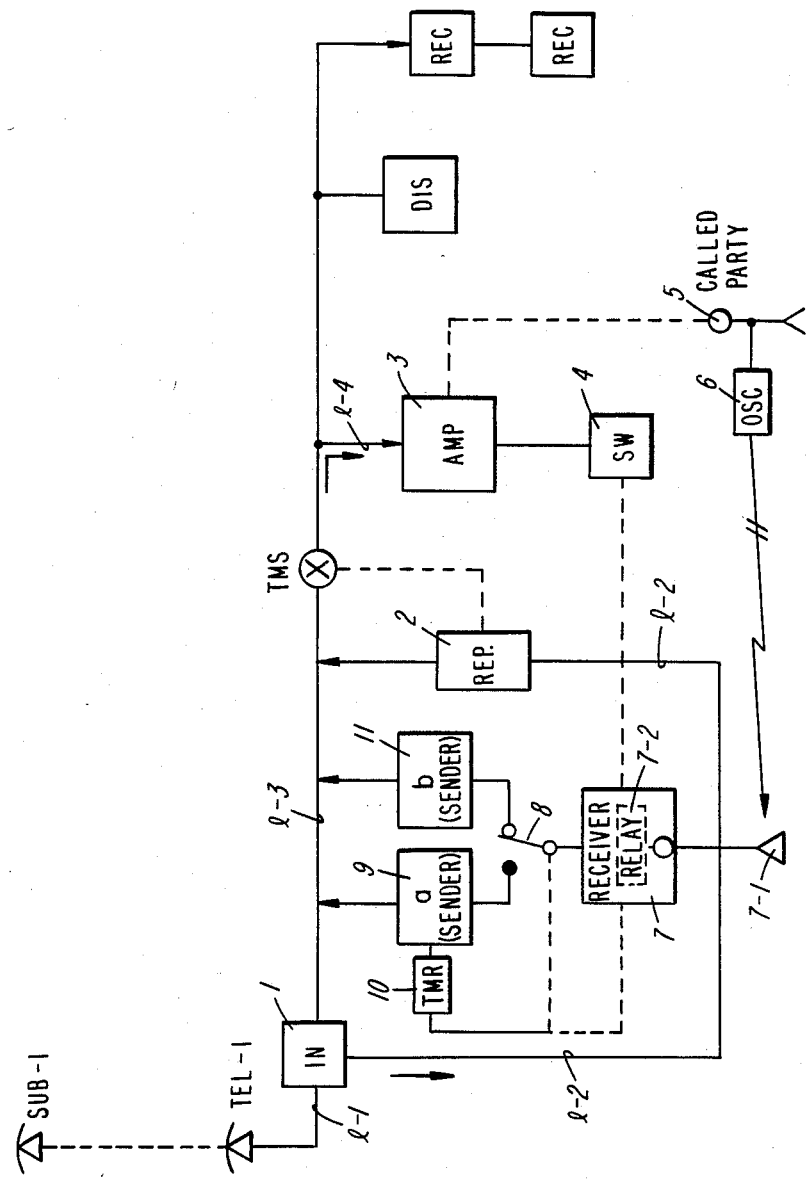

AUTOMATIC TELEPHONE ANSWERING APPARATUS

DETAILED DESCRIPTION OF THE INVENTION

Conventionally, various apparatuses are known which automatically answer a telephone call and record a caller's message. Among them, there has been provided an apparatus which has a particular application and function as in Japanese Patent Application No. 43-15530 (U.S. Pat. No. 4,069,397; to be referred to as the prior application hereinafter) which is filed by the same applicant. The present invention relates to an improvement over the apparatus of the prior application.

In order to use an automatic telephone answering apparatus as an automatic answering apparatus when someone is in fact present, the apparatus of the prior application is operated as follows. After a loop circuit is engaged upon reception of a telephone call, a prerecorded first message, e.g., "This is Hashimoto's. Who's calling, please?" is delivered for requesting a caller to give his or her name. When the caller gives his name upon hearing this request, an amplifier is rendered operative only for several seconds to amplify the caller's response. The caller's voice is thus reproduced through a loudspeaker so that upon hearing the voice a person around the telephone set can decide whether he should be on the line even during a meeting or work, or use the apparatus to answer the call.

However, even if this apparatus is set and he has decided to answer the call immediately, the telephone set is not always located around him. In this case, according to the present invention, a called party carries a small ultrasonic or radio wave oscillator in his pocket to oscillate an ultrasonic or radio wave in order to set a message switch circuit within the apparatus so as to reproduce a second message "Please wait a moment". As a result, the called party can keep the caller waiting without being rude. Furthermore, according to the present invention, if the called party cannot be on the line immediately, he can simply leave the call because a third message "We are sorry but Hashimoto is not present at the moment. Please call again later or leave a message. We'll contact you as soon as possible." is reproduced.

It is, therefore, an object of the present invention to provide an automatic telephone answering apparatus which reproduces the second message "Please wait a moment." after the caller has given his name by the use of a radio wave oscillator or the like, so that the called party can keep the caller waiting without being rude.

It is a second object of the present invention to provide an automatic telephone answering apparatus which can reproduce the above-mentioned third message after several seconds if the second message "Please wait a moment." is not to be reproduced.

It is a third object of the present invention to provide an automatic telephone answering apparatus which can record the customer's message by an external recorder during a time interval described in the first and the second objects of the present invention.

The configuration and the functions of the present invention will be described below.

Referring to the drawing, reference symbol SUB-1 denotes a caller and TEL-1 denotes a called party's telephone set. Reference numeral 1 denotes a known incoming circuit of an automatic telephone answering apparatus connected to the telephone set TEL-1. The incoming circuit mainly consists, in general, of a so-called sensing circuit, a ringing circuit and a relay circuit which engage a loop circuit of a telephone circuit in response to a 16 Hz ringing.

Reference numeral 2 denotes a means for reproducing a prerecorded first message "This is Hashimoto's. Who's calling, please?" upon engagement of the loop circuit by the incoming circuit 1. The caller SUB-1 hears this message and gives his name, e.g., says "This is Yamaguchi speaking.". His voice is amplified and reproduced by an amplifier 3 through lines 1-1, 1-3 and 1-4 around the telephone set. This was described in detail in the prior application mentioned above. Reference symbol TMS denotes a switching means for performing a switching function within a limited time interval. After the first message is reproduced, the switching means TMS switches the reproducing circuit to the incoming circuit to operate the amplifier for several seconds corresponding to a time period during which the caller says "This is Yamaguchi speaking.". When the amplifier 3 amplifies the caller's voice for this time period, a voice switch means 4 is operated. The voice switch means 4 renders an ultrasonic or radio wave receiver 7, to be described later, operative. More specifically, when the amplifier 3 amplifies the caller's voice, a called party 5 of the automatic telephone answering apparatus who is somewhere in an office can know who is calling. The called party 5 determines whether he should be on the line immediately or use the apparatus to answer it. If the called party determines that he should be on the line immediately, he depresses a button of an oscillator 6 in his pocket. A radio or ultrasonic wave is thus generated and is received by an antenna 7-1 of the receiver 7. An internal relay 7-2 is then operated so as to switch a switching contact 8 to the position opposite to that shown in the drawing. By means of the switching operation, the second message "Please wait a moment." is reproduced from a second message sending means 9, and is reproduced to the caller through the line 1-3 and the telephone set TEL-1. The caller can then wait. The called party 5 can walk to the telephone without haste, pick up the receiver and start talking after saying "Thank you for waiting". If the called party 5 cannot walk to the telephone set TEL-1 for some reason, he can simply leave the call. Then, a timer circuit 10 starts operation after a predetermined time period, e.g., fifteen seconds, and restores the relay 7-2, so that the switching contact 8 is switched to the initial position. A known technique is used for this operation, and thus a detailed description thereof is omitted. In either case, it is rude to keep the caller waiting too long after the second message, e.g., "Please wait a moment." is reproduced. In this case, the timer circuit 10 automatically operates to switch the switching contact 8 to the initial position and the third message, e.g., "We are sorry but Hashimoto is not present at the moment. Please call again later or leave a message. We'll contact you as soon as possible." is automatically delivered. When the automatic telephone answering apparatus starts operation correctly and the first message ". . . Who's calling, please?" is reproduced from the means 2, the switching contact 8 is originally set at a position (hollow circle) shown in the drawing. If the caller does not give his name in response to the first message, the second message is automatically reproduced after several seconds even if the amplifier 3 is operative. However, if the caller gives his name during this period, the voice switch is energized to operate the receiver 7. The called party 5 controls the receiver 7 by the oscillator 6 so as to send the second message from the means 9.

In the above-described case, when the called party decides to be on the line, there is no practical problem if the automatic telephone answering apparatus is restored. However, if the called party 5 is not on the line and the third message is supplied, the apparatus requires means to record the caller's voice in the recording means or to restore the apparatus to the initial state after the third message ends. In the apparatus according to the present invention, a recorder REC performs the recording function and a discriminator DIS restores the apparatus upon detecting the end of the third message. Note that the restored waiting mode of the apparatus means that the loop circuit of the telephone circuit is disengaged and the message sending means in the apparatus is restored to its initial state.

The message sending means does not always use a tape. In order to reproduce a short message such as "Please leave your message." or "Please wait a moment.", a medium such as a tape is not needed, and a voice generating means such as a voice synthesizer can be used.

As has been described above, unlike in the conventional automatic telephone answering apparatus, the automatic telephone answering apparatus according to the present invention amplifies the name of the caller first for identifying the caller if the called party cannot be on the line directly, controls the apparatus by means of a radio wave oscillator, sends a message "Please wait a moment.", and thereafter holds the telephone line so that the called party can keep the caller waiting without being rude. If the called party cannot be on the line after this, the above-described third message is automatically reproduced. The automatic telephone answering apparatus according to the present invention has a wider practial application compared with a conventional apparatus of this type. The applicant of the present invention thus requests the present invention to be patented with the scope defined above.

BRIEF DESCRIPTION OF THE DRAWING

The accompanying drawing is a block diagram of the apparatus according to the present invention.

In the drawing, reference symbol SUB-1 denotes a caller; TEL-1, a called party's telephone set; 1, an incoming circuit; 2, a first message sending means; 3, an amplifier; 4, a voice switch circuit; 5, a called party; 6, an oscillator carried by the called party; 7, radio or ultrasonic wave oscillator; 8, a switch; 9, a second message sending means; 10, a timing circuit; and 11, a third message sending means.

I claim:

1. An automatic telephone answering apparatus comprising:
    means for detecting a telephone call from a calling telephone and in response engaging a loop circuit;
    means for reproducing a first message after said loop circuit is engaged in order to announce a name of a called party and ask a caller's name;
    a wireless transceiver carried by the called party;
    means for amplifying and reproducing a caller's voice in the region of a called party telephone set to which said apparatus is connected when the caller gives his name in response to the first message;
    means for receiving an acknowledgement signal from said transceiver to automatically reproduce a second message and transmit said second message to the calling telephone;
    timer means for establishing time durations; and
    means for reproducing a third message after a first time duration established by the timer has elapsed when the caller does not give his name in response to the first message.

2. An apparatus according to claim 1, further comprising circuit means for automatically reproducing the third message after a second time duration established by the timer after the second message is reproduced.

3. An apparatus according to claim 1, further comprising means for recording the caller's message or else terminating communication after a third time duration established by the timer after the third message is reproduced.

* * * * *